(12) United States Patent
Jogikalmath et al.

(10) Patent No.: US 11,179,663 B1
(45) Date of Patent: Nov. 23, 2021

(54) POLYURETHANE-BASED MATERIALS

(71) Applicant: Aviro LLC, Newton, MA (US)

(72) Inventors: Gangadhar Jogikalmath, Chestnut Hill, MA (US); Deepak Arabagatte Ramappa, Somerville, MA (US)

(73) Assignee: AVIRO LLC, Newton, MA (US)

( * ) Notice: Subject to any disclaimer, the term of this patent is extended or adjusted under 35 U.S.C. 154(b) by 0 days.

(21) Appl. No.: 17/164,735

(22) Filed: Feb. 1, 2021

(51) Int. Cl.
| | |
|---|---|
| *B01D 46/00* | (2006.01) |
| *A62B 23/00* | (2006.01) |
| *C08L 75/08* | (2006.01) |
| *C08K 5/541* | (2006.01) |
| *C08K 3/34* | (2006.01) |

(Continued)

(52) U.S. Cl.
CPC .......... *B01D 46/0028* (2013.01); *A62B 23/00* (2013.01); *B01D 39/1676* (2013.01); *B32B 5/022* (2013.01); *B32B 5/024* (2013.01); *B32B 5/18* (2013.01); *B32B 5/245* (2013.01); *C08K 3/042* (2017.05); *C08K 3/346* (2013.01); *C08K 5/01* (2013.01); *C08K 5/19* (2013.01); *C08K 5/541* (2013.01); *C08L 75/08* (2013.01); *B01D 2239/0258* (2013.01); *B01D 2239/0442* (2013.01); *B01D 2239/0464* (2013.01); *B01D 2239/0645* (2013.01); *B01D 2239/0654* (2013.01); *B01D 2239/1216* (2013.01); *B01D 2239/1291* (2013.01); *B01D 2279/35* (2013.01); *B01D 2279/50* (2013.01);

(Continued)

(58) Field of Classification Search
CPC ............ B01D 39/1676; B01D 46/0028; B01D 2239/0258; B01D 2239/0442; B01D 2239/0464; B01D 2239/0645; B01D 2239/0654; B01D 2239/1216; B01D 2239/1291; B01D 2279/35; B01D 2279/50; B01D 2279/65; B32B 5/022; B32B 5/024; B32B 5/245; B32B 5/18; B32B 2250/02; B32B 2266/0278; B32B 2266/104; C08L 75/08; C08K 5/01; C08K 5/19; C08K 5/541; C08K 3/042; C08K 3/346; A62B 23/00

See application file for complete search history.

(56) References Cited

U.S. PATENT DOCUMENTS

2010/0258977 A1* 10/2010 Sakurai .................. A61K 47/30
                                                                    264/291
2010/0294313 A1* 11/2010 Baus ................... B01D 39/1676
                                                                    134/21

(Continued)

FOREIGN PATENT DOCUMENTS

| CN | 106432785 A | * | 2/2017 | ............. C08J 9/365 |
| FR | 2984176 A1 | * | 6/2013 | ............. A62B 23/00 |

OTHER PUBLICATIONS

FR2984176A1_ENG (Espacenet machine translation of Skorupinski) (Year: 2013).*

(Continued)

*Primary Examiner* — Jonathan Miller
*Assistant Examiner* — Gabriel E Gitman
(74) *Attorney, Agent, or Firm* — Hodgson Russ LLP (57) ABSTRACT

Disclosed are polyurethane-based foams. The foams may have one or more vicrucidal/bactericidal agents. The foams may be used as filters that capture and/or inactivate viral particles, such as, virions associated with COVID-19. Also described are methods of making the foams and methods of using the foams.

18 Claims, 5 Drawing Sheets

2D Flat Surface

| Sample | % Deactivated of that captured | % Attached | % Deactivated / Captured |
|---|---|---|---|
| NE Lab Control | 0 | 55 | 0.0 |
| DMS | 42.8 | 70 | 61.1 |
| BC | 30.1 | 80 | 37.6 |
| CPC | 22.1 | 90 | 24.6 |
| AVIRO Control | 0 | 55 | 0.0 |

(51) Int. Cl.
*C08K 3/04* (2006.01)
*C08K 5/01* (2006.01)
*B32B 5/18* (2006.01)
*B32B 5/24* (2006.01)
*B32B 5/02* (2006.01)
*B01D 39/16* (2006.01)
*C08K 5/19* (2006.01)

(52) U.S. Cl.
CPC ...... *B01D 2279/65* (2013.01); *B32B 2250/02* (2013.01); *B32B 2266/0278* (2013.01); *B32B 2266/104* (2016.11)

(56) References Cited

U.S. PATENT DOCUMENTS

| | | | | |
|---|---|---|---|---|
| 2011/0070423 | A1* | 3/2011 | Jayakody | A61L 15/26 428/309.9 |
| 2012/0070481 | A1* | 3/2012 | Bolkan | C11D 3/48 424/404 |
| 2013/0101674 | A1* | 4/2013 | Toft | A01N 25/04 424/497 |
| 2014/0033895 | A1* | 2/2014 | Wiley | G10D 13/02 84/421 |
| 2015/0328490 | A1* | 11/2015 | McDaniel | C09D 5/34 106/18.32 |
| 2016/0185076 | A1* | 6/2016 | Lawrence | B32B 5/08 442/370 |
| 2016/0295858 | A1* | 10/2016 | Mason | A01N 55/00 |
| 2017/0056834 | A1* | 3/2017 | Bhushan | C09D 139/04 |
| 2018/0272258 | A1* | 9/2018 | Healey | B01D 39/163 |

OTHER PUBLICATIONS

CN106432785A_ENG (Espacenet machine translation of Zhang) (Year: 2017).*

* cited by examiner

FIG. 1

2D Flat Surface

| Sample | % Deactivated of that captured | % Attached | % Deactivated | % Deactivated / Capture |
|---|---|---|---|---|
| NE Lab Control | 0 | 55 | 0 | 0.0 |
| DMS | 42.8 | 70 | 30 | 61.1 |
| BC | 30.1 | 80 | 30 | 37.6 |
| CPC | 22.1 | 90 | 22 | 24.6 |
| AVIRO Control | 0 | 55 | 0 | 0.0 |

POLYURETHANE-BASED MATERIALS

BACKGROUND OF THE DISCLOSURE

Due to the coronavirus pandemic, there is an enhanced interest in materials used to protect against the virus. Many such innovations are happening in PPE space by improving masks, overalls, breathing apparatuses, etc. There is also an enhanced interest in equipment that handle air in enclosed spaces, such as offices, homes, schools, and hospitals. While many of the existing filtration devices such as HEPA filters are effective in capturing the airborne pathogens, there is scrutiny as to the longevity of captured pathogens in these filters. There is concern that while the pathogens are captured, some of these filters provide an environment for the pathogens to sustain and re-release back into the circulating air.

A way to capture and neutralize the airborne pathogens is needed. A filter (either a mask or a HEPA) needs to have a material and chemistry innovation that brings about a virucidal or bactericidal effect. The non-woven fibers used in these filtration devices are often made of polyolefins to ensure there is a triboelectric effect, which increases capture efficiency. The inertness of the polyolefin fibers decreases the ease by which the fibers can be chemically modified. Thus, there is a need for additional coatings or surface modifications to enhance the neutralizing capability of these filters.

SUMMARY OF THE DISCLOSURE

The present disclosure provides filters comprising one or more virucidal/bactericidal agent(s). Filter may comprise one or more polyurethane-based foam(s). Also describes are devices comprising the filters. Also describes are methods of making the foams.

In an aspect, the present disclosure provides filters. The filters comprise one or more polyurethane-based polymer foam(s). The one or more polyurethane-based polymer foam(s) may comprise one or more virucidal/bactericidal agent(s).

The filters may comprise various polyurethane-based polymer foams. The polyurethanes-based polymers are made from various isocyanates (e.g., polyisocyanates) and polyols or a combination thereof. Various methods of making polyurethanes are known in the art.

In an aspect, the present disclosure provides devices that comprise a filter of the present disclosure. In various examples, the devices can comprise one or more additional filters, such as, for example, HEPA filters.

In an aspect, the present disclosure provides methods of making a filter of the present disclosure or a device comprising a filter of the present disclosure.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides filters comprising one or more virucidal/bactericidal agent(s). Filter may comprise one or more polyurethane-based foam(s). Also describes are devices comprising the filters. Also describes are methods of making the foams. The foams may capture and/or inactivate viral particles, such as, virions associated with COVID-19.

As used herein, unless otherwise stated, the term "group" refers to a chemical entity that has one terminus or two or more termini that are covalently bonded to one or more other chemical spec(ies). The term "group" includes radicals (e.g., monovalent and multivalent, such as, for example, divalent, trivalent, and the like, radicals). Examples of groups include, but are not limited to:

As used herein, unless otherwise indicated, the term "aliphatic groups" refers to branched or unbranched hydrocarbon groups that, optionally, contain one or more degrees of unsaturation. Degrees of unsaturation include, but are not limited to, alkenyl groups, alkynyl groups, and aliphatic cyclic groups. Aliphatic groups may be a $C_1$ to $C_{20}$ aliphatic group, including all integer numbers of carbons and ranges of numbers of carbons therebetween (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, and $C_{20}$). Aliphatic groups may be unsubstituted or substituted with one or more substituents. Examples of substituents include, but are not limited to, halogens (—F, —Cl, —Br, and —I), aliphatic groups (e.g., alkyl groups, alkenyl groups, alkynyl groups, and the like), halogenated aliphatic groups (e.g., trifluoromethyl group and the like), aryl groups, halogenated aryl groups, alkoxide groups, amine groups, nitro groups, carboxylate groups, carboxylic acids, ether groups, alcohol groups, alkyne groups (e.g., acetylenyl groups and the like), and the like, and combinations thereof. Aliphatic groups may be alkyl groups, alkenyl groups, alkynyl groups, or carbocyclic groups, and the like.

As used herein, unless otherwise indicated, the term "alkyl groups" refers to branched or unbranched saturated hydrocarbon groups. Examples of alkyl groups include, but are not limited to, methyl groups, ethyl groups, propyl groups, butyl groups, isopropyl groups, tert-butyl groups, and the like. For example, an alkyl group is a $C_1$ to $C_{12}$ alkyl group, including all integer numbers of carbons and ranges of numbers of carbons therebetween (e.g., $C_1$, $C_2$, $C_3$, $C_4$, $C_5$, $C_6$, $C_7$, $C_8$, $C_9$, $C_{10}$, $C_{11}$, or $C_{12}$). The alkyl group may be unsubstituted or substituted with one or more substituent(s). Examples of substituents include, but are not limited to, substituents such as, for example, halogens (—F, —Cl, —Br, and —I), aliphatic groups (e.g., alkyl groups, alkenyl groups, alkynyl groups), aryl groups, alkoxide groups, amine groups, carboxylate groups, carboxylic acids, ether groups, alcohol groups, alkyne groups (e.g., acetylenyl groups), and the like, and combinations thereof.

As used herein, unless otherwise indicated, the term "aryl groups" refers to $C_5$ to $C_{14}$ (e.g., $C_5$, $C_6$, $C_7$, $C_8$, $C_9$, $C_{10}$, $C_{11}$, $C_{12}$, $C_{13}$, or $C_{14}$), including all integer numbers of carbons and ranges of numbers of carbons therebetween, aromatic or partially aromatic carbocyclic groups. Aryl groups may be referred to as aromatic groups. The aryl groups may comprise (or be) polyaryl groups such as, for example, fused ring or biaryl groups. The aryl group may be unsubstituted or substituted with one or more substituent(s). Examples of substituents include, but are not limited to, substituents such as, for example, halogens (—F, —Cl, —Br, and —I), aliphatic groups (e.g., alkenes, alkynes), aryl groups, alkoxides, carboxylates, carboxylic acids, ether groups, sulfonic acids/sulfonates (which may be present as a salt such as, for example, a Group I cation, Group II cation, ammonium salt, or the like, or a combination thereof) groups, and the like, and combinations thereof. Examples of aryl groups include, but are not limited to, phenyl groups, biaryl groups (e.g., biphenyl groups), and fused ring groups (e.g., naphthyl groups).

In an aspect, the present disclosure provides filters. The filters comprise one or more polyurethane-based polymer foam(s). The one or more polyurethane-based polymer foam(s) may comprise one or more virucidal/bactericidal agent(s).

The filters may comprise various polyurethane-based polymer foams. The polyurethanes-based polymers are made from various isocyanates (e.g., polyisocyanates) and polyols or a combination thereof. Various methods of making polyurethanes are known in the art.

Various isocyanates (e.g., polyisocyanates) can be used to prepare a polyurethane-based polymer. Polyisocyanates may be aromatic or aliphatic. Examples of aromatic polyisocyanates include, but are not limited to, p-xylylene diisocyanate, 1,4-phenylene diisocyanate, 2,4-toluene diisocyanate, 2,6-toluene diisocyanate, 4,4'-methylene bis(phenyl isocyanate), 2,4'-methylene bis(phenyl isocyanate), 1,5-naphthylene diisocyanate, para-tetra methylxylene diisocyanate (p-TMXDI), meta-tetra methylxylene diisocyanate (m-TMXDI), and the like, and combinations thereof. Examples of aliphatic polyisocyanates include, but are not limited to, ethylene diisocyanate, 1,6-hexamethylene diisocyanate, isophorone diisocyanate (IPDI), cyclohexane-1,4-diisocyanate, 4,4'-dicyclohexylmethane diisocyanate, and the like, and combinations thereof.

Various polyols may be used to prepare a polyurethane-based polymer. Polyols may be aliphatic. Polyols may have 2, 3, 4, 5, or more hydroxyl groups. Non-limiting examples of polyols include ethylene glycol, diethylene glycol, triethylene glycol, tetraethylene glycol, propylene glycol, tripropylene glycol, 1,3-propanediol, 1,3-butanediol, 1,4-butanediol, neopentyl glycol, 1,6-hexanediol, 1,4-cyclohexanedimethanol, HQEE, glycerol, trimethylolpropane, 1,2,6-hexanetriol, pentaerythritol, and the like, and combinations thereof.

Various polyamines may be used to prepare a polyurethane-based polymer. Polyamines may be aliphatic. Non-limiting examples of polyamines include polyvinylamine, branched or linear polyethyleneimine, polyallyl amine, and the like, and combinations thereof.

Various ratios of isocyanates to polyols may be used to prepare a polyurethane-based polymer. The resulting polyurethane-based polymers may be an isocyanate-terminated polyurethane or a hydroxyl-terminated polyurethane. A crosslinker of suitable functionality may be used to harden the polyurethane composition. Examples of crosslinkers include polyamines, polyisocyanates (blocked or unblocked), polyols, and polyepoxy compounds. Without intending to be bound by any particular theory, it is considered that as the amount of crosslinking increases, as does the hardness of the polymer. The ratio of polyol to polyisocyanate may range from 1:2 to 2:1, including every 0.1 ratio value and range therebetween Various polyurethane-based polymers may be used. Non-limiting examples of polyurethanes include those made from the polyols and isocyanates described herein. For example, a polyurethane is made from a PPG 2025 polyol and toluene diisocyanate Lupranat T80. Other non-limiting isocyanate and polyol combinations include PPG 2025 polyol and isophorone diisocyanate, PPG 2025 polyol and hexamethylene diisocyanate, and PPG 2025 polyol and methylene bis(4-cyclohexylisocyanate), and the like, and combinations thereof. In various examples, the polyurethane is a block copolymer made from blocks of any of the combinations of polyols and isocyanates disclosed herein. Other polyurethanes may be used. The polyol may have a molecular weight (Mw) of 400 to 8,000 Da or g/mol, including all 0.1 Da or g/mol values and ranges therebetween. Without intending to be bound by any particular theory, it is expected that changes in the Mw of polyol (soft segment) changes the softness/hardness of the resulting polyurethane.

The polyurethane-based polymer may be in the form of a foam. The foam may have one or more desirable properties, such as, for example, hardness, porosity, reactive functional groups to which virucidal/bactericidal agent(s) may be conjugated, and combinations thereof. The foam may be an open cell foam. Open cell foams may be made by using $CO_2$ generated by the reaction of an isocyanate and water to expand the foam. $CO_2$ release is fast and the $CO_2$ bubbles pop before the polymer solidifies resulting in an open cell architecture. Alternatively, the foam may be a closed cell foam. Closed cell foams may be formed via using liquid blowing agents, which are slow in gas release allowing the foam bubbles to solidify thus forming a closed cell foam.

In various examples, a polyurethane-based polymer foam of the present disclosure has a desirable hardness. The hardness of the polyurethane-based polymer foam may be adjusted by adjusting the ratio of polyisocyanates and polyols. For example, a higher isocyanate content correlates to a higher hardness, whereas a higher polyol content correlates with softness. The polyurethanes may have a wide range of hardnesses. For example, the polyurethanes may be soft (e.g., very soft, ~25 Shore OO) to hard (e.g., very hard, ~75 Shore D). For example, a polyurethane has a hardness of 20-80 Shore OO, including all 0.1 values and ranges therebetween. In various examples, a polyurethane has a hardness of 55 Shore A to 75 Shore D.

A polyurethane-based polymer foam of the present disclosure has a desirable porosity. The polyurethane-based polymer foam has a plurality pores. The pores are a network of cells that may be interconnected to provide a tortuous pathway for the pathogens entering these foams and enhance their ability to strike the surface of the foam. The pores may have a longest linear dimension (e.g., a diameter). In various examples, the pores have an average longest linear dimension of 1 to 100 µm, including every 0.1 µm integer and range therebetween. The polyurethane-based polymer foam may also have a desirable pore density. In various examples, softer polyurethane-based polymer foam have density in the range of 6-12 kg/m$^3$, including all 0.01 kg/m$^3$ values and ranges therebetween, and harder foams in the range of 20-100 kg/m$^3$, including all kg/m$^3$ values and ranges therebetween. In various examples, a polyurethane-based foam of the present disclosure has a density of 5-125 kg/m$^3$, including all 0.1 kg/m$^3$ values and ranges therebetween.

The surface chemistry of a polyurethane-based polymer foam may be replenished. Replenishment may be achieved by various methods. For example, a polyurethane-based polymer foam can comprise a polymer that replenishes surface chemistry based on temperature. Examples of temperature sensitive polymers include, but are not limited to, NiPAAM, polyethyleneglycol-polypropyleneglycol copolymers, and the like, and combinations thereof. Alternatively, surface replenishment may be aqueous-based replenishment. For example, the polymers may be water absorbent with swelling abilities. Examples of such polymers include, but are not limited to, polyurethane with high polyol content (e.g., a hygroscopic polyurethane), polyethyleneglycol and gels made therefrom, and crosslinked hydrogels prepared from acrylates. In various examples, a filter of the present disclosure may comprise one or more of these polymers. "Surface replenishment" used herein, is defined as renewal of surface chemistry when the chemical is depleted by the diffusion of the chemical from the interior of the foam to the exterior. Aqueous-based replenishment may be caused when water contained in an aerosol (such as, for example, virus containing aerosols) captured on foam surface is absorbed into the foam, thus causing the hydrophilic portion of the polyurethane (e.g., the polyol portion or portion formed from the polyols) to expand to absorb the water, thereby creating a more open structure, in turn allowing a chemical encapsulated in the foam to release into the water. Temperature-based replenishment may be caused when various segments of the polymer swell or contract due to changes in temperature. For example, in temperatures causing the polymer or a portion thereof to swell may cause a chemical to release faster.

A polyurethane-based polymer foam may comprise various virucidal/bactericidal agent(s). The virucidal/bactericidal agent(s) may be disposed on and/or encapsulated (e.g., fully encapsulated and/or partially encapsulated) by a carrier on a least a portion of a surface of a polyurethane-based foam. Alternatively, virucidal/bactericidal agent(s) may be covalently attached to at least a portion of a surface of the polyurethane-based foam. Alternatively, virucidal/bactericidal agent(s) may be disposed on and/or encapsulated by a carrier and/or covalently attached to least a portion of a surface of a polyurethane-based foam. Non-limiting examples of virucidal/bactericidal agent(s) include quaternary ammonium cations comprising one or more alkyl groups, and the like. In various examples, the quaternary ammonium cations further comprise one or more silyl groups that may have one or more alkoxy group(s) and/or one or more hydroxyl group(s). For example, the virucial agents are reactive and/or inactivate with SARS-Cov2 or COVID-19 viral particles.

Various carriers may be used to encapsulate or partially encapsulate virucidal/bactericidal agent(s). Non-limiting examples of carriers include polyurethane, polyethylene glycol, polyvinyl pyrrolidone, and the like, and combinations thereof. In various examples, the carrier is in the form of a microsphere, liposome, or the like, or a combination thereof. Virucidal/bactericidal agent(s) may be spray dried for encapsulation. In various examples, the carriers may facilitate controlled release. Release may be initiated by various triggers such as temperature, contact with water, and/or the like.

In various examples, virucidal/bactericidal agent(s) is/are disposed on and/or conjugated to one or more nanoparticles. Virucidal/bactericidal agent(s) may be conjugated to the nanoparticles using methods known in the art. Non-limiting examples of nanoparticles include clay, graphene, activated carbon, and combinations thereof.

Virucidal/bactericidal agent(s) may conjugated to nanoparticles and/or to a portion of (or all) a surface of a polyurethane-based polymer foam by various methods. Various methods for conjugation are known in the art. For example, virucidal/bactericidal agent(s) may be conjugated through acylation, Click chemistry, substitution reactions, or the like. In various examples, the functional group used to conjugate a virucidal/bactericidal agent(s) to a nanoparticle or a surface of a polyurethane-based polymer foam may be referred to as an "anchor point." In various examples, when virucidal/bactericidal agent(s) are conjugated (e.g., covalently attached) to a nanoparticle or a surface of a polyurethane-based polymer foam, it may be referred to as the virucidal/bactericidal agent(s) are "anchored."

A filter of the present disclosure may be disposed on various substrates. For example, a polyurethane-based polymer foam comprising one or more virucidal/bactericidal agent(s) may be disposed on a substrate. Various substrates may be used. The substrates may be other filters. In various examples, the substrate is a HEPA filter, non-woven mat, woven mat, or the like, or a combination thereof. Paper-based filtration membranes, natural fiber based cellulosic membranes, non-woven mats prepared from natural fibers may be substrates. A polyurethane-based polymer foam comprising one or more virucidal/bactericidal agent(s) disposed on a HEPA filter may be prepared by coating a portion of a surface or all of a surface of a HEPA filter with a polyurethane precursor, which is then foamed.

A polyurethane-based polymer foam may comprise various carbon-based materials, which may be nanoparticles. These carbon-based materials may be high surface area nanoparticles. The carbon-based materials may be added to the polyurethane premix prior to foaming and prior to deposition of the polymer onto a substrate. The carbon-based materials may be used to lower the release rate of encapsulated virucidal/bactericidal agent(s). Without intending to be bound by any particular theory, it is considered that the high aspect ratio carbon-based materials can coat the walls of the foam, thus restricting the diffusion of the virucidal/bactericidal agent(s) out of the foam and onto the surface of the foam. Examples of carbon-based materials include, but are not limited to, fullerene, CNTs, graphene, graphite, activated carbon, activated carbon fibers, carbon aerogels, and the like, and combinations thereof. Examples of carbon-based materials may have the following properties:

| Carbon-based material | Specific surface area (m² g⁻¹) | Density (g cm⁻³) |
| --- | --- | --- |
| Fullerene | 1100-1400 | 1.72 |
| CNTs | 120-500 | 0.6 |
| Graphene | 2630 | >1 |
| Graphite | 10 | 2.26 |
| Activated carbon | 1000-3500 | 0.4-0.7 |
| Templated porous carbon | 500-3000 | 0.5-1 |
| Activated carbon fibers | 1000-3000 | 0.3-0.8 |
| Carbon aerogels | 400-1000 | 0.5-0.7 |

In an aspect, the present disclosure provides devices that comprise a filter of the present disclosure. In various examples, the devices can comprise one or more additional filters, such as, for example, HEPA filters.

Various devices may comprise a filter of the present disclosure. A device may be a mask, a breathing apparatus, a face covering, a vent cover, an HVAC system, an air handling system, an air purifier, an air conditioner, or the like.

The device may be used to capture and/or inactivate various viruses and bacteria. For example, a device of the present disclosure is used to capture and/or inactivate COVID-19 viral particles.

In an aspect, the present disclosure provides methods of making a filter of the present disclosure or a device comprising a filter of the present disclosure.

A polyurethane-based polymer may be produced by various methods. A method may comprise preparing a reaction mixture comprising one or more polyisocyanates and one or more polyols and/or polyamines and mixing. The reaction mixture may further comprise one or more catalyst(s). The reaction mixture may be called a premix. One or more virucidal/bactericidal agent(s) may be added to the premix. The virucidal/bactericidal agent(s) may be encapsulated or partially encapsulated in a carrier. Examples of carriers are provided herein. Virucidal/bactericidal agent(s) may be conjugated to anchor points using conjugation chemistry described herein or conjugation known in the art. The premix may be foamed. Foaming may be achieved via using water and/or addition of one or more blowing agent(s).

In various examples, virucidal/bactericidal agent(s) are added to the isocyanate part or to the polyol part or dissolved/dispersed in the water phase. When virucidal/bactericidal agent(s) are added to the water phase, the water reacts with the isocyanate, releasing $CO_2$, which pushes the dispersed virucidal/bactericidal agent(s) against the edges of the growing bubbles, thereby entrapping the virucidal/bactericidal agent(s) prior to polyurethane solidification, resulting in foam walls decorated with the virucidal/bactericidal agent(s).

A polyurethane-based polymer of the present disclosure may be made by various polyisocyanates and polyols. Various ratios of isocyanates and polyols may be used. Examples of polyisocyanates include, but are not limited to, p-xylylene diisocyanate, 1,4-phenylene diisocyanate, 2,4-toluene diisocyanate, 2,6-toluene diisocyanate, 4,4'-methylene bis(phenyl isocyanate), 2,4'-methylene bis(phenyl isocyanate), 1,5-naphthylene diisocyanate, para-tetra methylxylene diisocyanate (p-TMXDI), meta-tetra methylxylene diisocyanate (m-TMXDI), ethylene diisocyanate, 1,6-hexamethylene diisocyanate, isophorone diisocyanate (IPDI), cyclohexane-1,4-diisocyanate, 4,4'-dicyclohexylmethane diisocyanate, and the like, and combinations thereof. Examples of polyols include, but are not limited to, ethylene glycol, diethylene glycol, triethylene glycol, tetraethylene glycol, propylene glycol, tripropylene glycol, 1,3-propanediol, 1,3-butanediol, 1,4-butanediol, neopentyl glycol, 1,6-hexanediol, 1,4-cyclohexanedimethanol, HQEE, glycerol, trimethylolpropane, 1,2,6-hexanetriol, pentaerythritol, and the like, and combinations thereof.

Polyols or alcohols may have one or more amine group. Polyamines may also be used to prepare a polyurethane of the present disclosure. Examples of molecules including amine groups (e.g., polyamines, or polyols or alcohols with amine groups) include, but are not limited to ethanolamine, diethanolamine, methyldiethanolamine, phenyldiethanolamine, triethanolamine, N,N,N',N'-tetrakis(2-hydroxypropyl)ethylenediamine, diethyltoluenediamine, dimethylthiotoluenediamine, and the like, and combinations thereof.

Various crosslinkers may be used to crosslink a polyurethane-based polymer of the present disclosure. Examples of crosslinkers include, but are not limited to, polyamines, polyisocyanates (blocked or unblocked), polyols, and polyepoxy compounds. Non-limiting examples of specific crosslinkers include, various polyols, such as, for example, ethylene glycol, diethylene glycol, triethylene glycol, tetraethylene glycol, propylene glycol, tripropylene glycol, 1,3-propanediol, 1,3-butanediol, 1,4-butanediol, neopentyl glycol, 1,6-hexanediol, 1,4-cyclohexanedimethanol, HQEE, glycerol, trimethylolpropane, 1,2,6-hexanetriol, pentaerythritol, and the like, and combinations thereof.

Various catalysts may be used to produce a polyurethane-based polymer of the present disclosure. Examples of catalysts include, but are not limited to, carboxylates, amines, bismuth carboxylates, zinc carboxylates, zirconium carboxylates, nickel carboxylates, and the like. Catalysts may be amine (e.g., tertiary amine) catalysts. Examples of amine catalysts include, but are not limited to, triethylenediamine (TEDA), N,N,N',N'',N''-pentamethyldiethylenetriamine (TOYOCAT DT), 1,2-dimethylimidazole (TOYOCAT DMI), N,N,N',N'-tetramethyl-1,6-hexanediamine (TOYOCAT MR), N,N',N'-trimethylaminoethylpiperazine (TOYOCAT NP), 1,1'-[[3-(dimethylamino)propyl]imino]bispropan-2-ol (TOYOCAT RX4), N,N,N'-trimethylaminoethylethanolamine (TOYOCAT RX5), N,N',N''-Tris(3-dimethylaminopropyl)-hexahydro-s-triazine (TOYOCAT TRC), and the like.

Various blowing agents may be used to produce of a foam. Blowing agents may decompose and release gases via a physical or chemical manner. Examples of blowing agents include, but are not limited to, azodicarbamide (ADC), n-pentane and methyl formate and, chemical blowing agents such as water. Water may be used a carrier for high surface area particles. When water reacts with isocyanate, it releases $CO_2$, which is a foaming agent. The $CO_2$ gas may carry suspended high surface area particles and against the forming foam surface, thus coating them in this manner. The polyurethane dispersion may be coated onto a non-woven mat, or fabric, or the like. The coated fabric may then be exposed to heat or humidity or allowed to stand for a period of time. Application may be through a roll-to-roll process.

Virucidal/bactericidal agent(s) may be added at various points during the preparation of the polyurethane-based polymer foam. For example, the virucidal/bactericidal agent(s) may be added during foaming, conjugated during polymerization and/or foaming, or applied to a set foam, or via any other method described herein. Non-limiting examples of virucidal/bactericidal agent(s) include quaternary ammonium cations comprising one or more alkyl groups, and the like. In various examples, the quaternary ammonium cations further comprise one or more silyl groups that may have one or more alkoxy group(s) and/or one or more hydroxyl group(s). In various examples, virucidal/bactericidal agent(s) can be surfactants. These surfactants may also act as pore openers resulting in open cell foams containing virucidal/bactericidal agent(s). Examples of such surfactants include, but are not limited to cetyl pyridinium chloride, benzalkonium chloride, and the like, and combination thereof.

In various examples, the surfactants comprise quaternary amine groups. The quaternary amine groups may be cationic above pH 3. These surfactants may become part of the foam yielding an antiviral surface. Examples of such surfactants include, but are not limited to benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride, and the like, and combinations thereof.

In various examples, polyurethane microspheres can encapsulate one or more virucidal/bactericidal agent(s). The microspheres may be added to foam (e.g., web of non-woven filters). For example, the microspheres can be sprayed onto the forming web and suspended in the aqueous medium or solvent carrier.

Virucidal/bactericidal agent(s) applied via spray-dried encapsulants. The resulting particles may be different size and can be tuned by changing the spray drying conditions. Spray drying may be accomplished by mixing the encapsulant solution in a volatile organic solvent and spraying into an evacuated chamber thus producing solid and porous particles. The ratio of encapsulant to solvent and the speed of spray and the opening of the nozzle used to spray may change the size/shape and porosity of the spray-dried particles. Thus, this property can be used to burst small or large particles by the use of temperature. Accordingly, antiviral content (e.g., content of virucidal/bactericidal agent(s)) of the filter can be replenished over time. In various examples, the particles may be from 1 µm to 1 mm, including everyone 0.1 µm value and range therebetween.

In various examples, chain extenders can be used in fabrication of a foam of the present disclosure. Without intending to be bound by any particular theory, it is considered chain extenders can tune the porosity and release rates of encapsulated virucidal/bactericidal agent(s). Examples of chain extenders include, but are not limited to polyols, such as those described herein. For example, the chain extender is polyethylene glycol, polypropylene glycol, or copolymers thereof, or the like. Chain extenders may be added into the polyurethane pre-mix.

Polyethylene oxide may be used in a method of making a polyurethane-based polymer foam of the present disclosure. Without intending to be bound by any particular theory, PEO-based polyurethane-based polymers are considered to exhibit sensitivity to water due to the hydrophilicity and water-absorbing capacity of the ethylene oxide units. For example, the higher the PEO content, the higher the degree of swelling, which may increase the virucidal/bactericidal agent(s) release rate.

Pore formers may be used in a method of making a polyurethane-based polymer foam of the present disclosure. Without intended to be bound by any particular theory, it is considered that pore formers create higher surface area and also enhance release of encapsulated virucidal/bactericidal agent(s). For example, fibers (e.g., fibers of a non-woven mat or woven fabric or the like) are coated with a polyurethane solution containing the antiviral compound. The polyurethane solution also contains PEO or similar water soluble polymer or oligomer that is not covalently attached to the polyurethane polymer. When such coated fibers are in contact with an aqueous environment, they either swell or release PEO to the environment thus forming pores on the surface of the fiber and thus enhancing the release of the antiviral from the interior of the coating. Examples of pore formers are provided herein.

Pores may be formed by using thermally labile molecules incorporated into the polyurethane-based polymer. When the polyurethane-based polymer is heated thermally labile molecules degrade and/or sublimate resulting in the formation of pores. Examples of thermally labile molecules include, but are not limited to, 1,3,5-Triazine, 1,3,5-Trimethylhexahydro-1,3,5-triazine, 3-Amino-1,2,4-triazine, 2-Amino-4,6-dichloro-1,3,5-triazine, 3-Amino-5,6-dimethyl-1,2,4-triazine, 2-Amino-4-methoxy-6-methyl-1,3,5-triazine, 2,4-Diamino-6-methyl-1,3,5-triazine (acetoguanamine), 2,4-Diamino-6-phenyl-1,3,5-triazine (benzoguanamine), 2,4-Diamino-6-hydroxypyrimidine, 3,5-Diamino-1,2,4-triazole, 2,4-Diamino-6-[3-(trifluoromethyl)phenyl]-1,3,5-triazine, 2,5-diamino-1,3,4-thiadiazole, 1,2,3-Triazole-4,5-dicarboxylic acid, amitrol, 3-Amino-1,2,4-triazole-5-thiol, 2,4-Diamino-6-hydroxypyrimidine, 1,2,4-Triazole-3-carboxylic acid, 2,4-Diaminopyrimidine, 2,4,6-Triaminopyrimidine, triamterene, and the like, and combinations thereof.

The steps of the method described in the various embodiments and examples disclosed herein are sufficient to carry out the methods of the present invention. Thus, in an embodiment, the method consists essentially of a combination of the steps of the methods disclosed herein. In another embodiment, the method consists of such steps.

The following examples are presented to illustrate the present disclosure. They are not intended to be limiting in any matter.

Example 1

This example provides a description of foams of the present disclosure and uses thereof.

Certain polymers are able to form foams and provide a network of cells that are interconnected to provide a tortuous pathway for the pathogens entering these foams and enhance their ability to strike the surface of the foam. Polyurethane are one class of such polymers able to form foams in a facile manner owing to the chemistry of the monomers used in making them. The foams can be generated very easily either via using water or other additional blowing agents that decompose and release gases either via physical or chemical manner. The chemistry of polyurethane made by the reaction of isocyanates and polyols provides an easy way to anchor reactive chemistries on the polyurethane surface.

COVID-19 was purchased from ATCC and cultured at 200 ng/ml on each substrate under standard virus culturing conditions for 4 hours. At the end of that time period, the supernatant was washed and a 1% wt. crystal violet stain (Sigma) added and incubated for 1 hour. Then, the supernatant was removed and rinsed with PBS three times. At that time, 60% ethanol was added and the crystal violet stain was eluted, collected, and run through a spectrophotometer. Color intensity was measured and compared to a standard curve to determine how much COVID-19 was attached to the materials. Further, to determine inactivation of COVID-19 after attachment to the surfaces, the same but separate experiments as the above were conducted, and qPCR experiments conducted at the end of given timeframe to analyze for genes indicative of COVID-19 activity. All experiments were conducted in triplicate and repeated at three different times.

Example 2

This example provides a description of foams of the present disclosure and uses thereof.

Polyurethane foams were made using the formulations listed below as a guide. The polyol/isocyanate ratio was varied to get different foam densities. Surfactant and blowing agent content altered the density and the cell type (closed versus open) morphologies. Antiviral component was mixed with the polyol segment during the foam formation where applicable. Antiviral components include Benzalkonium chloride (BC), Cetyl pyridinium chloride (CPC), Dimethyloctadecyl[3-(trimethoxysilyl)propyl]ammonium chloride (DMS) and a combination there of.

| Component | Formulation 1 | Formulation 2 | Formulation 3 | Formulation 4 | Formulation 5 |
| --- | --- | --- | --- | --- | --- |
| PPG 2025 Polyol (soft segment) | 30 | 30 | 40 | 50 | 60 |
| Water (blowing agent) | 2 | 2 | 2 | 4 | 4 |
| Toluene diisocyanate Lupranat T80 (rigid Isocyanate) | 100 | 100 | 100 | 100 | 100 |
| triethylenediamine (catalyst) | 1 | 1 | 1 | 1 | 1 |
| VoraSurf DC 3042 Surfactant | 1 | 1 | 1 | 1 | 3 |
| Antiviral | 0 | 5 | 5 | 5 | 5 |

Figure 1:
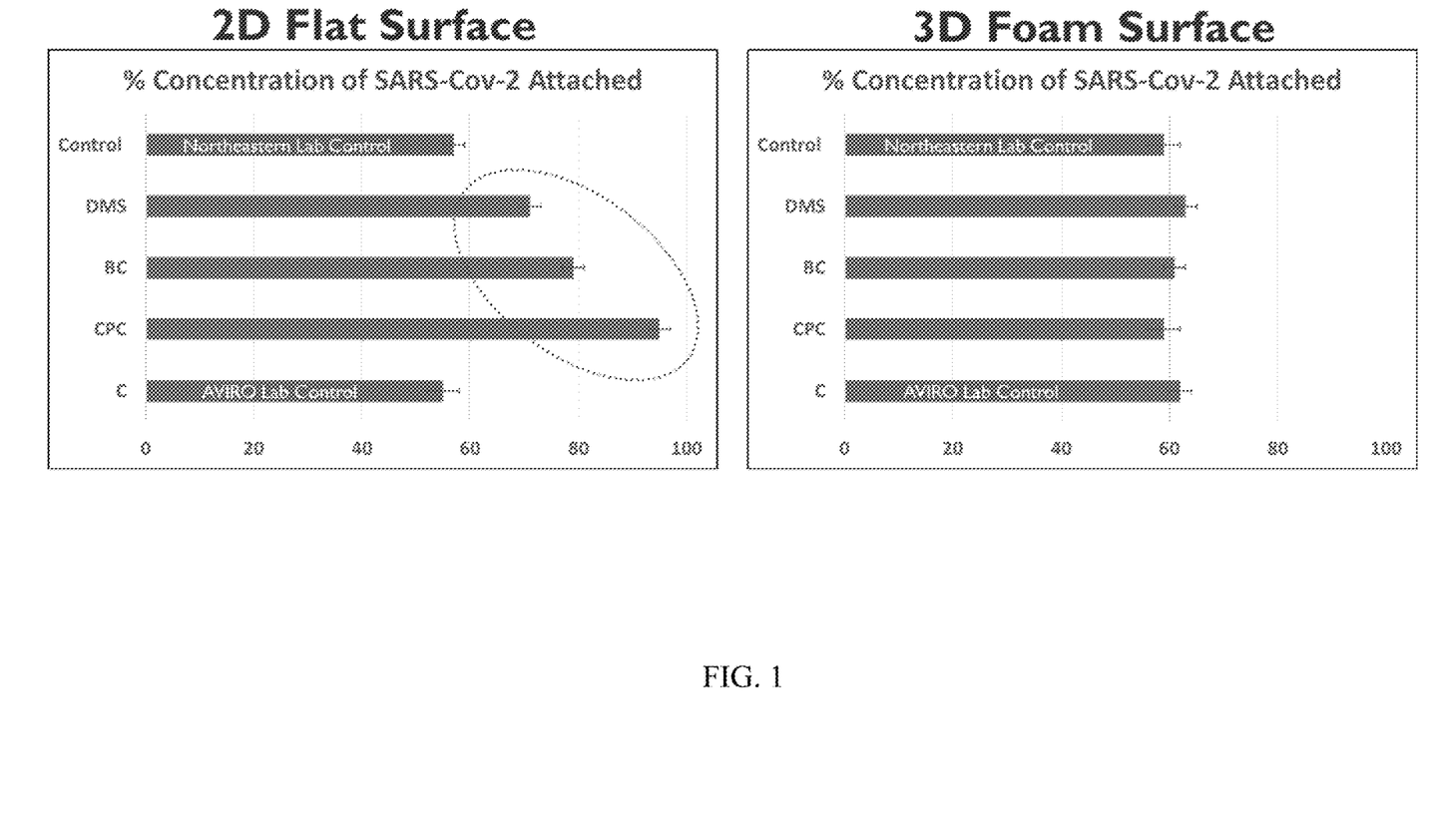
FIG. 1 shows virus capture by coated surfaces. Increases in SARS-Cov2 capture rates were observed by a foam of the present disclosure (CPC), with roughly 95% capture.
Figure 2:
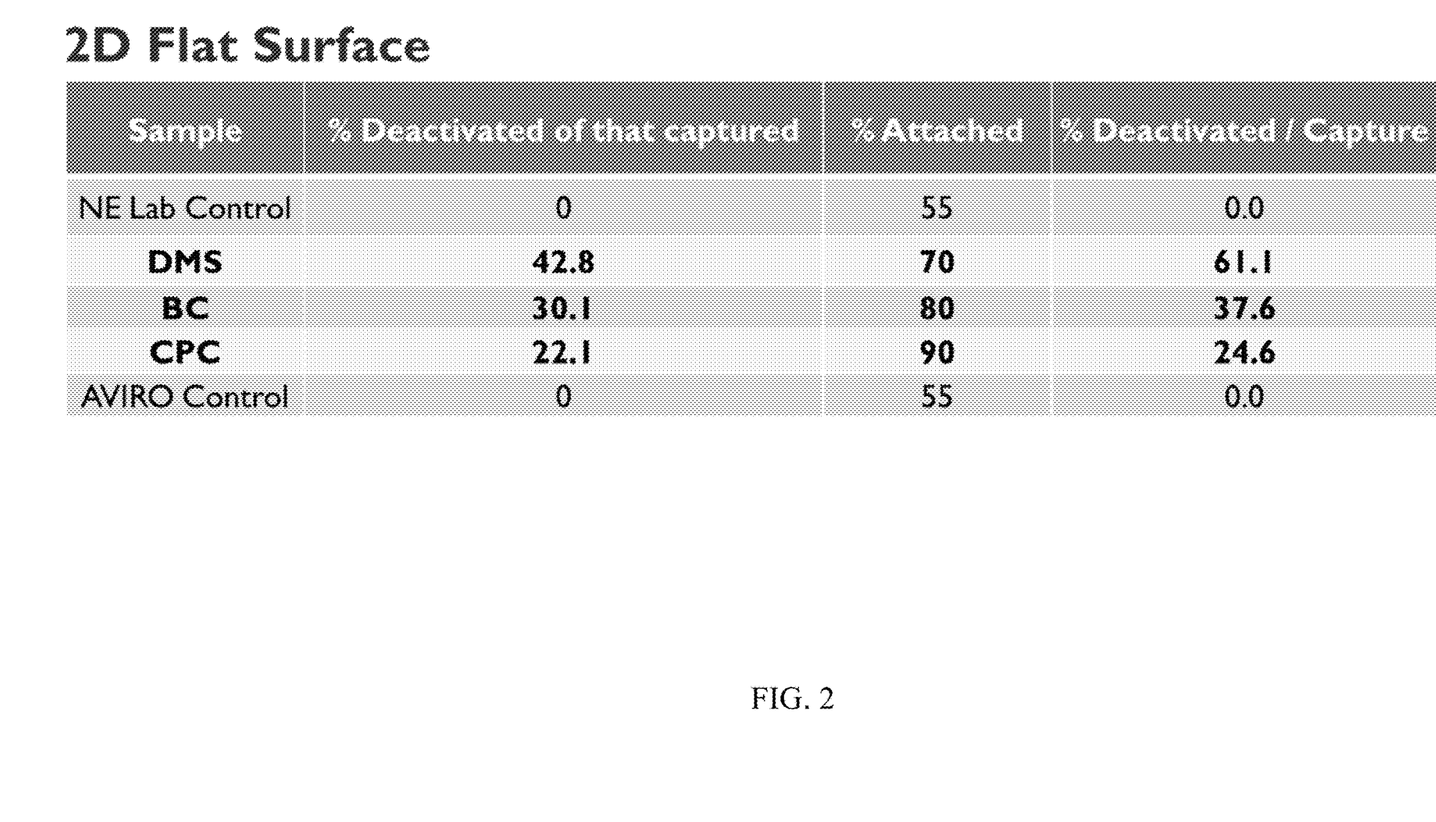
FIG. 2 shows DMS has the highest potential to deactivate captures virus.
Figure 3:
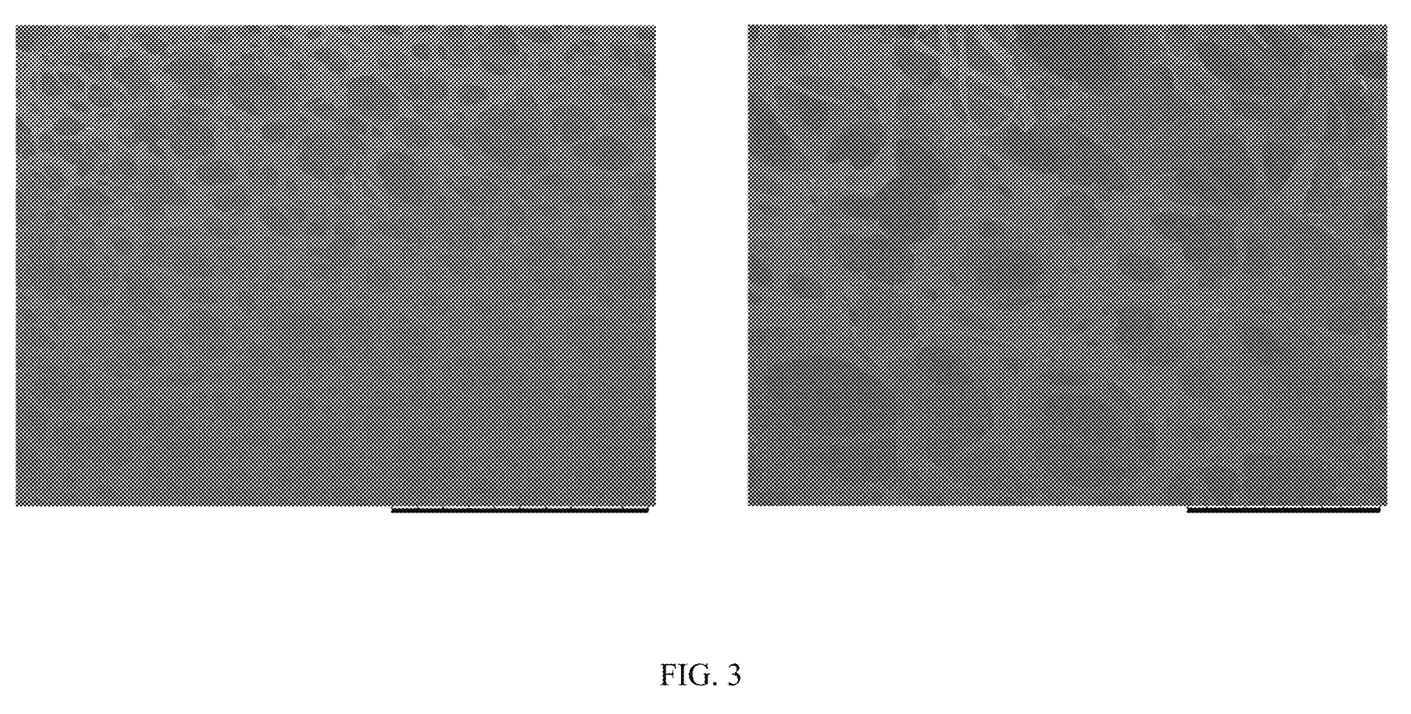
FIG. 3 shows micrographs of foam of the present disclosure.
Figure 4:
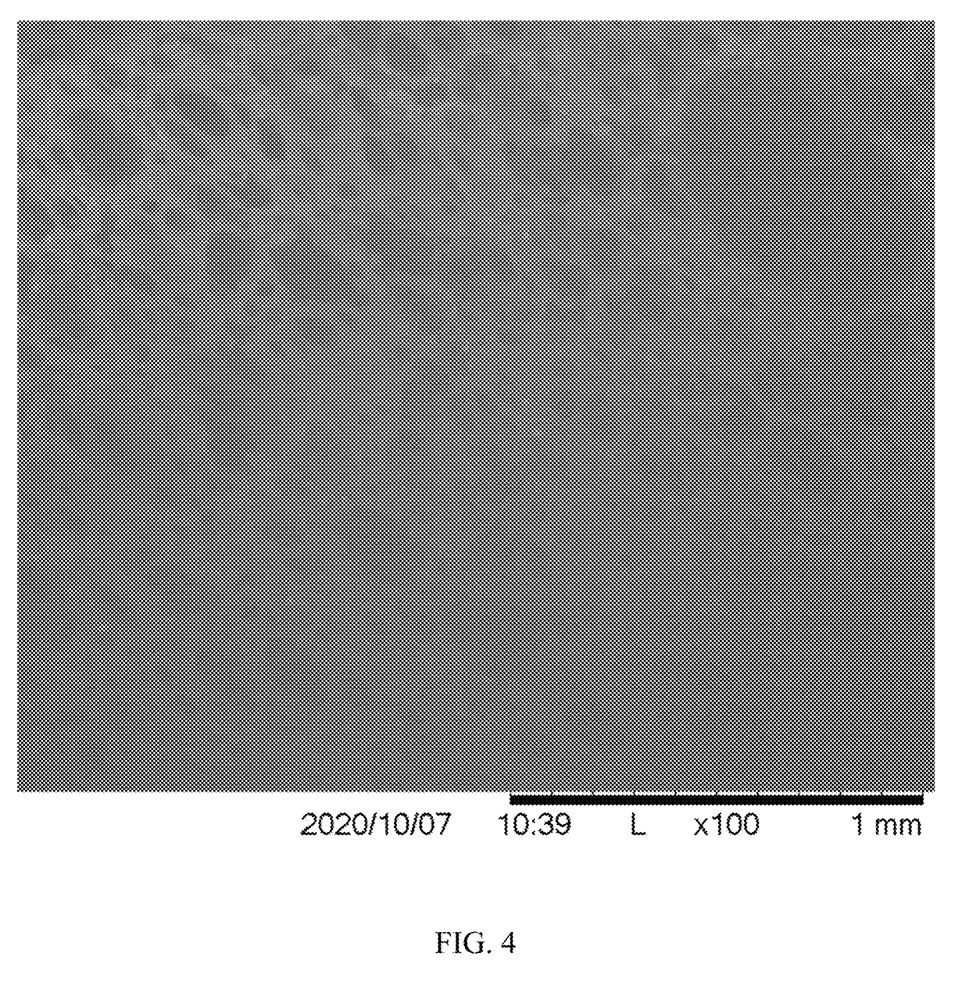
FIG. 4 shows a micrograph of hard foam formulation 2.
Figure 5:
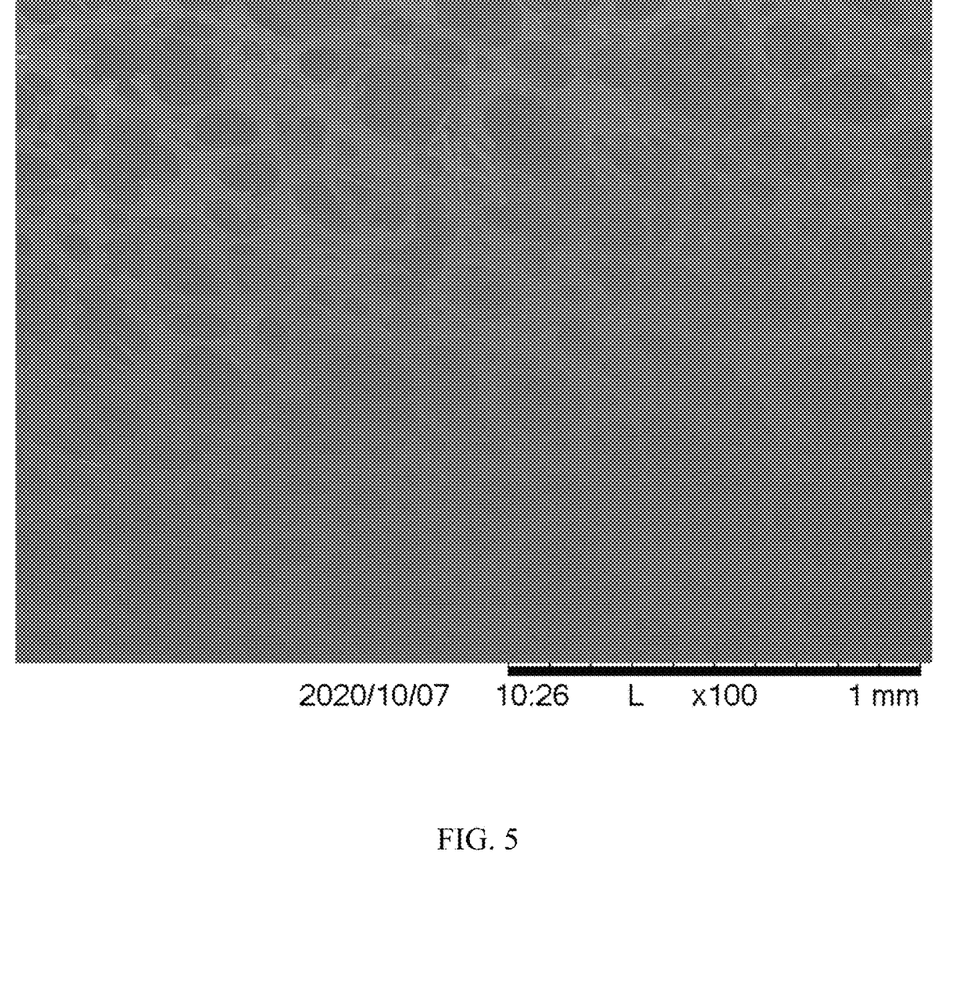
FIG. 5 shows a micrograph of soft foam formulation 5.

The FIGS. 4 and 5 show the High-density (HD) and Medium density (MD) foams obtained that will be used in the subsequent Examples listed below.

Example 3

The foam formulations made in Example 2 were coated with the three antiviral compounds described in Example 2. The coronavirus capture and deactivation tests described in experiment 1 were used for assessment. As the table below shows, each antiviral compound individually had varied response in virus capture and deactivation. The antiviral compounds were then blended in various ratios for the next experiments to enhance capture and deactivation of the coronavirus

| Sample | % Deactivated of that captured | % Attached |
| --- | --- | --- |
| Control | 0 | 55 |
| DMS | 42.8 | 70 |
| BC | 30.1 | 80 |
| CPC | 22.1 | 90 |
| Control | 0 | 55 |

Example 4

The foam formulations made in Example 2 were coated onto various substrates or foams themselves used as is to test against the coronavirus capture and deactivation. Two different kinds of foams were used. HD and MD and coated with a combination of antiviral compounds to maximize both capture and deactivation.

| Sample | % Deactivated of that captured | % Attached |
| --- | --- | --- |
| MD-F2 | 82.3 | 85 |
| MD-Control | 39.4 | 56 |
| HD-2 | 92.4 | 97 |
| HD-Control | 52.3 | 59 |

MD—Medium density foam.
HD—High-density foam

Although the present disclosure has been described with respect to one or more particular embodiments and/or examples, it will be understood that other embodiments and/or examples of the present disclosure may be made without departing from the scope of the present disclosure.

The invention claimed is:

1. A filter comprising one or more polyurethane-based polymer foam(s) wherein at least one of the polyurethane-based polymer foam(s) comprises one or more virucidal/bactericidal agent(s) chosen from cetylpyridinium chloride (CPC), dimethyloctadecyl[3-(trimethyloxysilyl)propyl]ammonium chloride (DMS), and combinations thereof, wherein
   a portion of or all of a surface of the at least one polyurethane-based polymer foam(s) have one or more virucidal/bactericidal agent(s) conjugated thereto, and/or
   the polyurethane-based polymer foam(s) encapsulate(s) the one or more virucidal/bactericidal agent(s).

2. The filter of claim 1, wherein the conjugated one or more virucidal/bactericidal agent(s) are covalently attached to at least a portion of a surface of the at least one polyurethane-based polymer foam(s).

3. The filter of claim 1, wherein the one or more polyurethane-based polymer foam(s) have a plurality of pores.

4. The filter of claim 3, wherein the pores have an average diameter of 1 to 100 μm.

5. The filter of claim 1, wherein the one or more polyurethane-based polymer foam(s) has a density of 5-125 kg/m$^3$.

6. The filter of claim 1, wherein the one or more polyurethane-based polymer foam(s) have a hardness of 20-80 Shore OO.

7. The filter of claim 1, wherein the one or more virucidal/bactericidal agent(s) is encapsulated in or partially encapsulated in one of the at least one polyurethane-based polymer foams and is further encapsulated in a carrier, wherein the carrier comprises polyurethane, polyethylene glycol, or polyvinyl pyrrolidone.

8. The filter of claim 7, wherein the carrier is a microsphere.

9. The filter of claim 1, wherein the one or more virucidal/bactericidal agent(s) are disposed on and/or conjugated to a plurality of nanoparticles.

10. The filter of claim 9, wherein the plurality of nanoparticles are chosen from clay, graphene, activated carbon, and combinations thereof.

11. The filter of claim 1, wherein the one or more polyurethane-based polymer foam(s) is/are formed from (i) one or more isocyanate(s), one or more polyol(s), and one or more blowing agent(s); (ii) one or more isocyanate(s), and one or more blowing agent(s); or (iii) a combination thereof.

12. The filter of claim 11, wherein the one or more isocyanate(s) are chosen from p-xylene diisocyanate, 1,4-phenylene diisocyanate, 2,4-toluene diisocyanate, 2,6-toluene diisocyanate, 4,4'-methylene bis(phenyl isocyanate), 2,4'-methylene bis(phenyl isocyanate), 1,5-naphthylene diisocyanate, 2,4'-methylene bis(phenyl isocyanate) and 4,4'-methylene bis(phenyl isocyanate), ethylene diisocyanate, para-tetra methylxylene diisocyanate (p-TMXDI), meta-tetra methylxylene diisocyanate (m-TMXDI), 1,6-hexamethylene diisocyanate, isophorone diisocyanate (IPDI), cyclohexane-1,4-diisocyanate, 4,4'-dicyclohexylmethane diisocyanate, and combinations thereof.

13. The filter of claim 11, wherein the one or more blowing agent(s) are chosen from azodicarbamide, water, n-pentane, methyl formate, and combinations thereof.

14. The filter of claim 1, further comprising a HEPA filter.

15. The filter of claim 1, wherein the filter is disposed on a substrate.

16. The filter of claim 15, wherein the substrate is chosen from paper-based filtration membranes, natural fiber based cellulosic membranes, woven mats, non-woven mats, and HEPA filters.

17. A device comprising a filter of claim 1 and, optionally, a HEPA filter.

18. The device of claim 17, wherein the device is a mask, a breathing apparatus, a face covering, a vent cover, an HVAC system, an air handling system, an air purifier, or air conditioner.

* * * * *